Nov. 23, 1948.  F. W. KRUEGER  2,454,285
CONTAINER FEEDER
Filed July 3, 1944  3 Sheets-Sheet 1
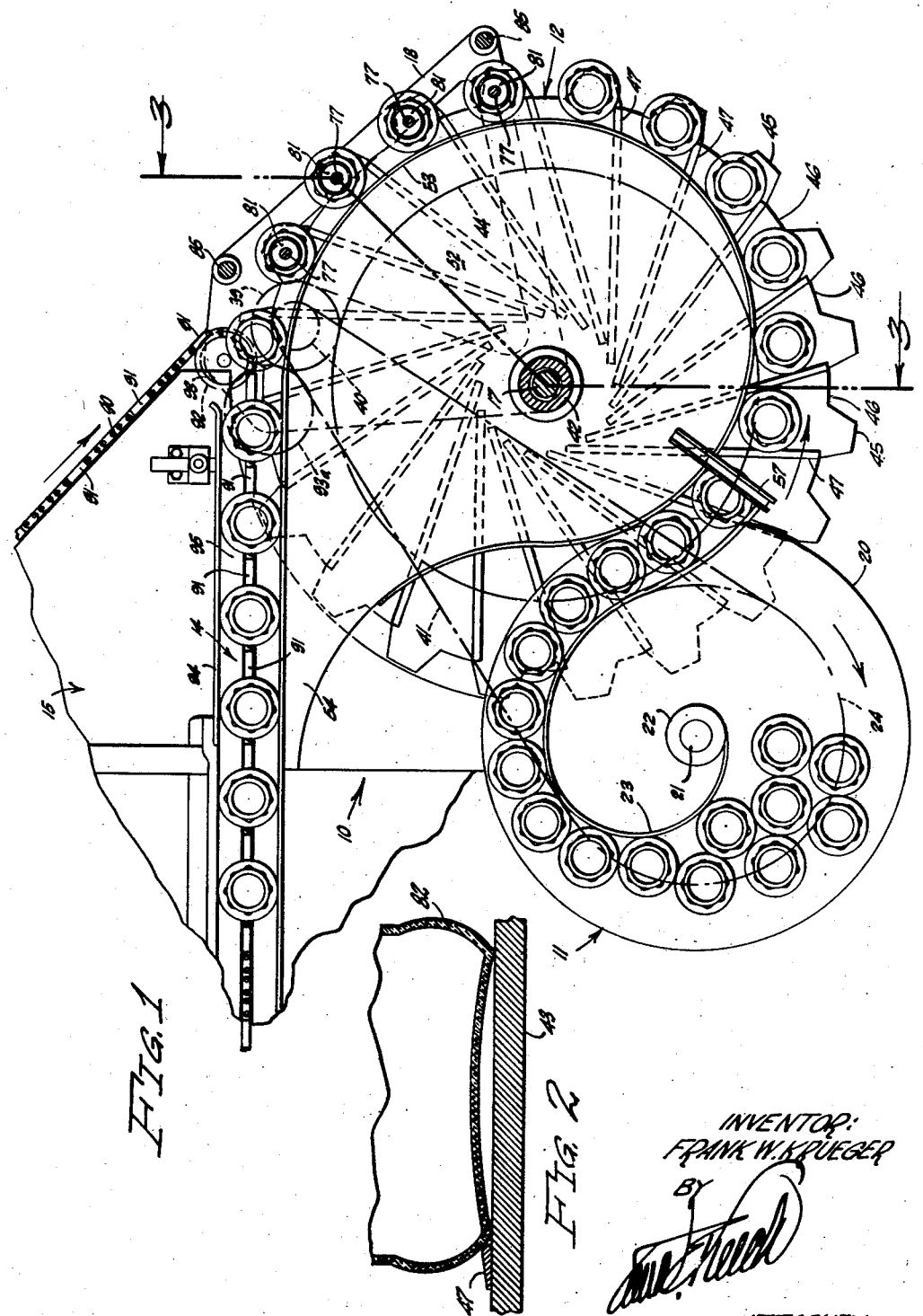
INVENTOR:
FRANK W. KRUEGER
BY
ATTORNEY Nov. 23, 1948.  F. W. KRUEGER  2,454,285
CONTAINER FEEDER
Filed July 3, 1944  3 Sheets-Sheet 2
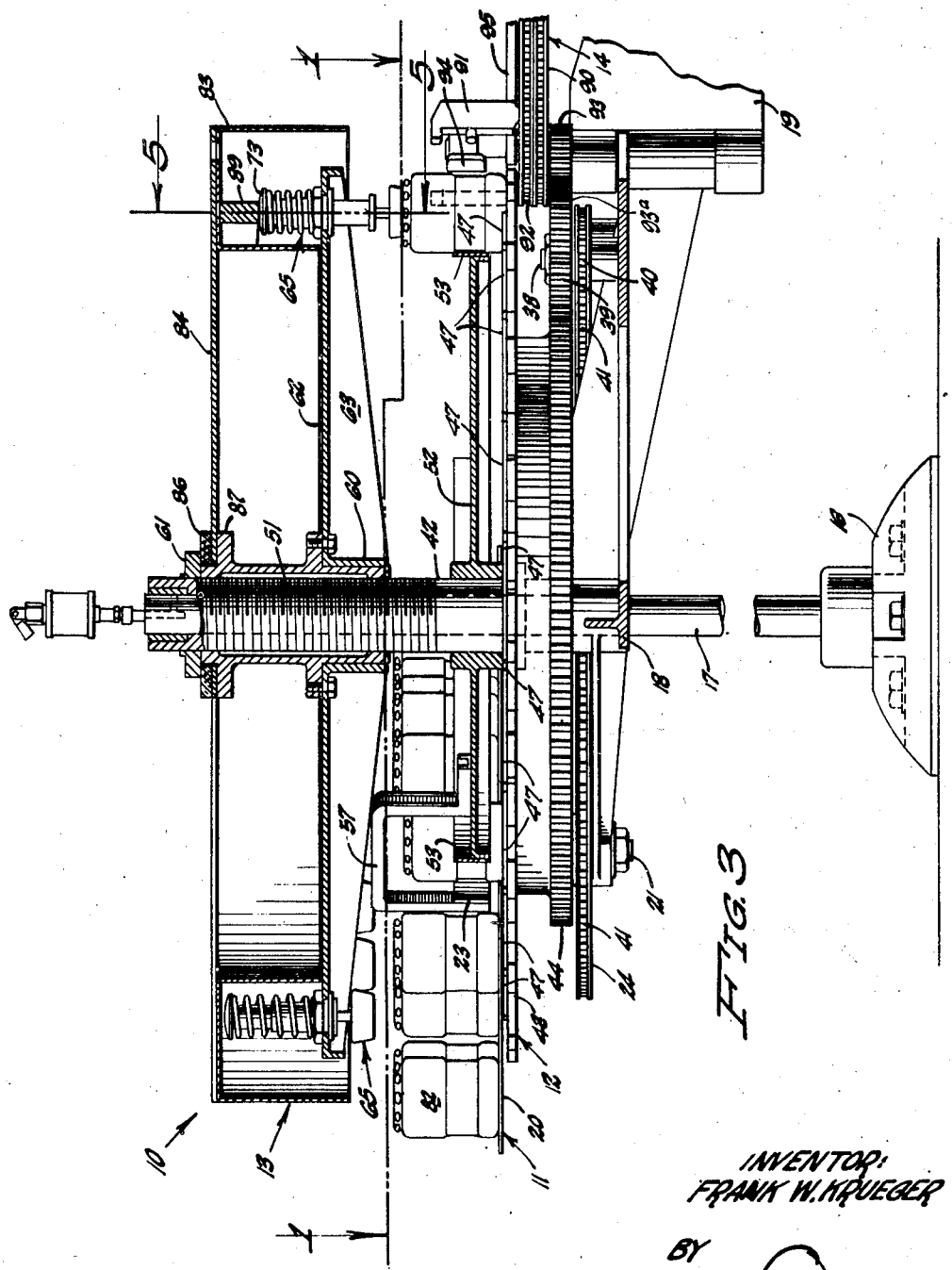
INVENTOR:
FRANK W. KRUEGER
BY
ATTORNEY

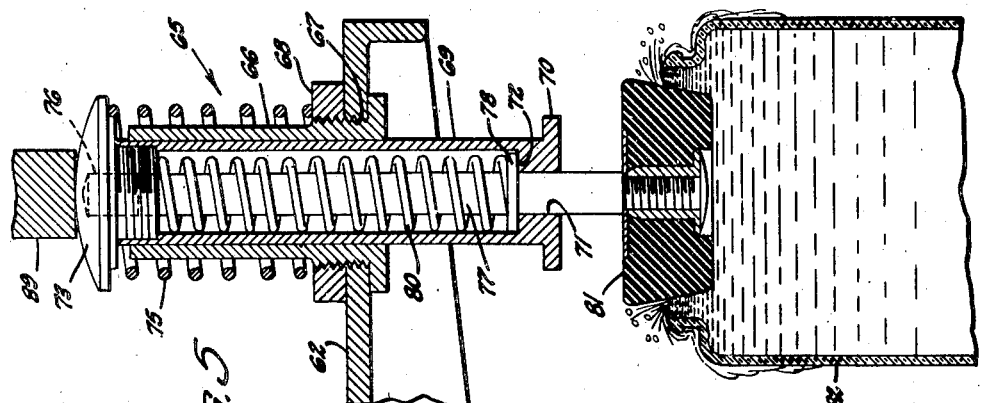
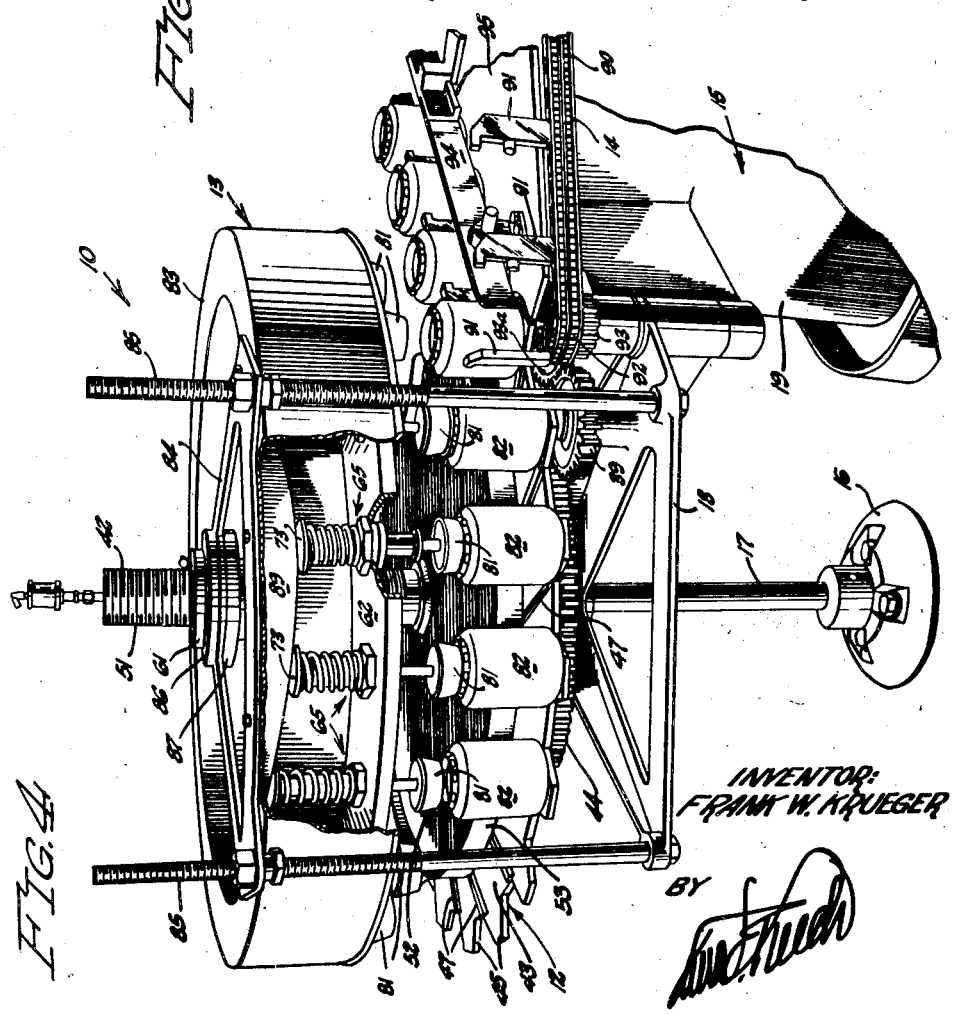

Patented Nov. 23, 1948

2,454,285

UNITED STATES PATENT OFFICE 2,454,285

CONTAINER FEEDER

Frank W. Krueger, Atherton, Calif., assignor to Food Machinery Corporation, San Jose, Calif., a corporation of Delaware Application July 3, 1944, Serial No. 543,337

5 Claims. (Cl. 226—96)

1

In the canning industry, containers, which are generally either glass jars or cans, must be fed in an orderly manner to machines provided for filling and capping these.

It is an object of this invention to provide a novel and efficient feeder for accomplishing this.

Preceding the capping of such filled containers, it has been found preferable to tamp the pack down into the containers and remove any portion of the contents necessary to produce a uniform upper level of the contents in the containers located a short distance below the top of the container. This operation is termed "head spacing."

Another object of my invention is to provide a novel device for displacing the contents in the tops of containers while feeding the latter in timed relation to a machine for capping these.

The manner of accomplishing the foregoing objects, as well as further objects and advantages, will be made manifest in the following description taken in connection with the accompanying drawings, in which:

Fig. 1 is a horizontal sectional view of a preferred embodiment of the invention taken on the line 1—1 of Fig. 3.

Fig. 2 is an enlarged fragmentary sectional view taken on the line 2—2 of Fig. 1.

Fig. 3 is an enlarged vertical sectional view taken on the line 3—3 of Fig. 1, and illustrates how a guide engages a jar being handled by my invention.

Fig. 4 is a perspective view of my invention partly broken away to illustrate normally concealed details of the construction.

Fig. 5 is an enlarged detail sectional view taken on the line 5—5 of Fig. 3, illustrating the manner of operation of one of the tampers of my invention.

I will now refer specifically to the drawings which show a container feeding and head spacing device 10 which includes a rotary receiving conveyor 11, a rotary feeder 12, a rotary head spacer 13, and a carry-away conveyor 14, the latter being shown as mounted on a capper 15.

The device 10 is supported on a central pedestal 16 including a vertical shaft 17 which carries a horizontal spider frame 18, the latter preferably being connected to a base 19 of the capper 15 as shown in Figs. 3 and 4.

The rotary conveyor 11 comprises a horizontal disc 20 mounted on a vertical shaft 21, the lower end of which is fixed on the frame 18. Provided on the shaft 21 is a collar 22 to which is attached one end of a container guide rail 23. The disc 20

2 is driven by a sprocket 24 disposed therebeneath. The frame 18 has a stub shaft 38 (see Fig. 3) on which is provided a gear pinion 39 having a sprocket 40, the latter beeing connected by a chain 41 to the sprocket 24 for the purpose of rotating the disc 20.

The rotary feeder 12 has a hollow vertical shaft 42 which surrounds an upper portion of the shaft 17 and rests on the frame 18. Fixed on the lower end of the shaft 42 is a feeder plate 43 having a master gear 44 which meshes with the pinion 39 so as to be driven by the latter.

The plate 43 is generally circular in form, the periphery thereof being divided into alternate container supporting teeth 45 and notches 46. The upper surface of the plate 43 is provided with rib-like container guides 47, one of which is disposed just to the rear of each of the peripheral teeth 45, each of the guides 47 lying in a substantially spiral relation with the axis of the plate 43.

The hollow shaft 42 has a substantial upper portion thereof provided with external threads 51. Resting on the feeder plate 43 and rotatably mounted about an unthreaded lower portion of the hollow shaft 42 is a container guide 52 having a container-engaging rail 53. The guide 52 has a portion 54 which is connected to the capper 15 to prevent this guide from rotating with the shaft 42 about which it is mounted. The guide 52 has an inverted U-shaped bracket 57 which supports the forward end of the container guide rail 23. (See Figs. 1 and 3.)

The rotary head spacer 13 has an internally threaded hub 60 which screws onto the threads 51 and is held in a vertically adjustable position by a nut 61. The hub 60 has a circular platform 62 which is reinforced by weblike spokes 63 and carries near its periphery a series of tamping devices 65. These devices are identical, their construction being illustrated in detail in Fig. 5.

Each such device includes a flanged sleeve 66 which is inserted upwardly in a hole 67 formed in the platform 62 and is secured therein by a lock nut 68. Inserted upwardly into the sleeve 66 is a cylindrical shell 69 having an outward flange 70 and a hole 71 forming an annular inner shoulder 72 at its lower end. Screwed into the internally threaded upper end of the shell 69 is a shell head 73, having an internal bore 76. The shell 69 is normally held in its upper position with the flange 70 thereof contacting the sleeve 66, by a coiled expansive spring 75.

Disposed within the shell 69 and extending through the hole 71 is a tamper rod 77 having a shoulder 78 fixed thereon, this normally resting against the internal shoulder 72. The upper end of the rod 77 extends a slight distance into the bore 76 when the rod 77 is yieldably held downward in the position in which it is shown in Fig. 5 by a coiled expansive spring 80.

Mounted on the lower end of the tamper rod 77 is a tamper 81 which preferably has an inverted frustoconical shape and is adapted to readily fit inside the mouth of a container such as a glass jar 82 which the invention is adapted to handle.

The rotary head spacer 13 has an annular housing 83 which provides cover for that portion of the devices 65 which extend above the platform 62. This housing is supported on an overhead spider 84 which is rotatably mounted on the upper end of the hub 60 and is connected by frame shafts 85 to the spider frame 18 beneath the feeder plate 43. The hub 86 of the spider 84 rests upon a shoulder 87 formed on the hub 60 of the head spacer 13 and is held in place by the nut 61 so as to permit the hub 60 to rotate while the spider 84 remains stationary.

Mounted on the spider 84 within the housing 83 to extend downwardly along the path taken by the devices 65 as the platform 62 rotates, is a tamper operating cam 89 which engages the shell heads 73 to lower each tamper 81 into the mouth of the container 82 disposed therebeneath.

Following this action the cam 89 permits the shell head 73 to rise and thus withdraw the tamper 81 from the mouth of the container.

The rail 53 of the container guide 52 is preferably shaped as shown in Fig. 1 where it is seen that after spiralling outwardly from the axis of the plate 43, this rail, for a distance, becomes concentric with said axis, after which it then extends tangentially therewith and parallel with an adjacent portion of the chain conveyor 14.

The conveyor 14 includes a double chain 90 carrying a series of container-propelling upwardly-extending lugs 91, this chain passing around a sprocket 92 having a gear pinion 93 co-axially united therewith and pivotally mounted on a shaft provided on the capper frame 19. The pinion 93 meshes with a gear 93a which in turn meshes with the pinion 39 so that the application of power to the chain 90 causes the conveyor 14 to function, and also drives the conveyor 11, the feeder 12 and the head spacer 13. It is thus seen that all of these elements of the invention function coordinately with each other and with the conveyor 14.

Besides the chain 90 the conveyor 14 includes a side rail 94 and an operating runway 95. As clearly seen in Figs. 1 and 4, the containers move onto the split runway 95 of the conveyor 14 in spaces between adjacent lugs 91 after these containers are swept from the respective teeth 45 of the feeder 43 by the final portion of the guide rail 53 which is parallel with the conveyor 14.

Operation

While the feeder of my invention may be used to feed various kinds of containers and to feed these either when they are empty or filled, the preferred embodiment illustrated is shown as handling glass jars which have already been filled with a product before these jars are delivered onto the rotary conveyor 11. A number of these jars are shown in Fig. 1 as resting on this conveyor, these jars being shifted by contact with the rail 23 into a single file line of jars traveling along the exterior surface of this rail and being shunted off of the disc 20 by this rail onto the feeder plate 43.

The speed of rotation of the disc 20 is so fixed with respect to the speed of rotation of the feeder plate 43, that one jar is delivered onto the latter from the disc 20 for each of the angular spaces between adjacent container guides 47.

When thus delivered, each jar 82 may rest on the plate 43 within one of said angular spaces or it may be deposited on one of the guides 47. In either case, the jar is rotated and shifted by contact with the outwardly spiral portion of the rail 53 so that while still being so outwardly shifted by said rail, the jar comes into contact with the guide 47 immediately following said jar. Owing to the inclination of each of the guides 47 forwardly towards a radius intersecting its outer end, these guides remain in position controlling contact with jars 82 after the latter come into contact with said guides while resting flatly on the plate 43.

The speed with which the jars 82 travel on the plate 43 is accelerated owing to their being disposed an increasing distance from the axis of the plate as the jar follows the spiral surface of the rail 53. At the same time the movement of the jars on the plate 43 is further accelerated by the forward inclination of the guides 47. Thus, whenever a jar is moving outwardly in contact with both the rail 53 and one of the guides 47, this jar is also actually caused to revolve forwardly relative to the plate 43 in a counterclockwise direction.

Accomplishing the spacing of the jars 82 on the plate 43 by relatively shallow guides 47 onto which the jars may be deposited without spilling the contents of the jar, has the great advantage of allowing the jars to be delivered at random onto the plate 23 without respect to their relation to the guides 47.

As the jars 82 are propelled by the guides 47 along the pathway defined by the outer surface of the guide rail 53, these jars come opposite that portion of this path which is concentric with the shaft 42 and it is here where the cam 89 is located so as to operate the tamping devices 65 and extend the tampers 81 into the necks of the jars and then withdraw the tampers therefrom before the jars are shifted from the feeder plate 12 onto the runway 95 of the conveyor 14.

The head spacer 13 thus removes enough liquid from the upper end of each jar 82 so that a uniform amount of contents remains in these jars.

It is thus seen that I have provided, in my invention, a combined container unscrambling device, accelerating device, timing device and head spacing device.

While I have disclosed but a single preferred embodiment of my invention, it is to be understood that many modifications might be made in this without departing from the spirit of the invention or the scope of the appended claims.

I claim:

1. In a container feeder the combination of: a relatively flat plate; means for rotating said plate about a substantially vertical axis; a series of relatively shallow guides provided on the upper surface of said plate, said guides extending outwardly from a central area of said plate; and a container guide rail disposed above said plate, said rail being disposed to shift along said guides containers deposited on said plate and engaged by said guides, so that, in a certain zone of their travel on said plate, said containers are disposed at spaced intervals determined by the spacing of said guides.

2. In a container feeder the combination of: a relatively flat plate; means for rotating said plate about a subtantially vertical axis; a guide provided on the upper surface of said plate, said guide being so shallow in depth that a container deposited on top of it will not be upset thereby but may be shifted by pressure against the side of said container until said container rests flat against said plate; and a rail disposed above said plate at a level to be engaged by the side of a container carried by said plate said rail shifting such container away from over said guide if said container should overlie said guide, said rail cooperating with said guide, however, to shift a container lying flat against said plate in advance of said guide, along a path culminating with said container in a pre-determined delivery position.

3. In a container feeder the combination of: a relatively flat plate; means for rotating said plate about a substantially vertical axis; a guide provided on the upper surface of said plate, said guide being so shallow in depth that a container deposited on top of it will not be upset thereby but may be shifted by pressure against the side of said container until said container rests flat against said plate; and a rail disposed above said plate at a level to be engaged by the side of a container carried by said plate said rail shifting such container away from over said guide if said container should overlie said guide, said rail cooperating with said guide, however, to shift a container lying flat against said plate in advance of said guide, along a path extending outwardly from the axis of said plate and culminating with said container in a pre-determined delivery position.

4. In a container feeder the combination of: a relatively flat plate; means for rotating said plate about a substantially vertical axis; spaced guide means provided on the upper surface of said plate to rotate therewith, said guide means extending from a central area outwardly close to the periphery of said plate, there being alternate teeth and notches formed in said periphery, one of said teeth being provided just in advance of each of said guide means; rail means mounted above said plate, said guide means and rail means operating coordinately on each container resting on said plate to propel said container outwardly over a predetermined path and onto one of said teeth as a result of the rotation of said plate; and a conveyor disposed adjacent to said plate and having a series of spaced container propelling lugs which extend into said notches and engage said containers, said conveyor receiving said containers and conveying them away from said plate.

5. In a container feeder the combination of: a relatively flat plate; means for rotating said plate about a substantially vertical axis; a series of guides provided on the upper surface of said plate which are so shallow in depth that a container, deposited on top of one of said guides will not be upset thereby, but may be shifted by pressure against the side of said container until said container rests flat against said plate, said guides being disposed in substantially spiraled relation with said axis with their outer ends inclined in the direction of rotation of said plate; and a rail disposed above said plate at a level to be engaged by the side of a container carried by said plate, said rail shifting such container away from over one of said guides if said container should overlie said guide, said rail cooperating with any of said guides, however, to shift a container lying flat against said plate in advance of said guide, along a path culminating with said container in a predetermined delivery position.

FRANK W. KRUEGER.

REFERENCES CITED

The following references are of record in the file of this patent:

UNITED STATES PATENTS

| Number | Name | Date |
| --- | --- | --- |
| 1,972,841 | Guenther | Sept. 4, 1934 |
| 2,350,438 | Worz | June 6, 1944 |